United States Patent [19]
Fine

[11] Patent Number: 5,158,812
[45] Date of Patent: Oct. 27, 1992

[54] SEMICONDUCTING GLASS AND ARTICLE

[75] Inventor: Gerald J. Fine, Corning, N.Y.

[73] Assignee: Corning Incorporated, Corning, N.Y.

[21] Appl. No.: 759,876

[22] Filed: Sep. 13, 1991

[51] Int. Cl.$^5$ .............................. C03C 3/15; B32B 3/10
[52] U.S. Cl. ..................... 428/131; 428/426; 428/689; 428/702; 428/704; 501/50
[58] Field of Search ............... 428/131, 426, 689, 702, 428/704; 501/50

[56] References Cited

U.S. PATENT DOCUMENTS

| | | | |
|---|---|---|---|
| 3,615,762 | 10/1971 | Parry et al. | 501/50 |
| 3,672,920 | 6/1972 | Ishiguri | 501/50 |
| 3,677,778 | 7/1972 | Ali et al. | 501/50 |
| 3,782,958 | 1/1974 | Bishay et al. | 501/49 |
| 4,112,170 | 9/1978 | Rauscher | 428/428 |
| 4,330,629 | 5/1982 | Hing et al. | 501/50 |
| 4,629,486 | 12/1986 | Uchiyama et al. | 156/296 |
| 5,015,909 | 5/1991 | Zhong et al. | 501/37 |
| 5,034,354 | 7/1991 | Fine | 428/373 |

OTHER PUBLICATIONS

Lampton, Michael, "The Microchemical Image Intensifier", *Scientific American*, vol. 245, pp. 62-71, (1981).

*Primary Examiner*—Ellis P. Robinson
*Assistant Examiner*—William P. Watkins
*Attorney, Agent, or Firm*—Milton M. Peterson; Clinton S. Janes, Jr.

[57] ABSTRACT

A family of lanthana borate glasses modified by iron oxide to become semiconducting. The glasses resist devitrification, exhibit bulk resistivities in the range of $10^8$-$10^{12}$ ohms-cm and possess other properties to make them particularly suitable for use in producing perforated plates for such applications as multichannel plates. The glass consist essentially of 40-55% by weight $La_2O_3$, 25-40% $B_2O_3$ and 10-30% $Fe_2O_3$.

4 Claims, 2 Drawing Sheets

SEMICONDUCTING GLASS AND ARTICLE

FIELD OF THE INVENTION

The field is semiconducting, borate glasses and their use in perforated plates, such as used in multichannel plate devices.

BACKGROUND OF THE INVENTION

Microchannel plates (MCPs) are thin wafers of electrically conducting glass which contain thousands of open channels or tubes. Each channel diameter is on the order of 10 to 15 microns. The plates are used for the amplification of x-rays, ions, or electrons. They are an essential component of a variety of electronic devices, including night vision goggles.

The principles of microchannel plate fabrication and operation are described in detail in the literature. For example, see an article by Michael Lampton in Scientific American, 245, 62–71 (1981). A fabrication procedure in current use is described in detail in U.S. Pat. Nos. 4,629,486 (Uchiyama et al.) and No. 4,112,170 (Rauscher). The former is particularly concerned with alkali lead silicate cladding glasses; the latter with barium borosilicate core glasses.

Briefly, the method, as there described, involves fusing solid rods of a leachable core material, preferably glass, within tubular pieces of relatively non-leachable skin glass. A bundle of such composite bodies is formed and fusion sealed. The bundle is then drawn down, cut into lengths, rebundled and further drawn. Ultimately, a composite article is obtained in which an interconnected glass matrix of the skin glass encases an array of leachable core elements. The composite is then exposed to a leachant, for example, hydrochloric or nitric acid, to remove the cores. This leaves the skin glass matrix with an array of channels corresponding to the array of core elements. The channels may be on the order of ten microns in diameter. The perforated plate, thus formed, is then heated in a hydrogen-containing atmosphere to produce a surface layer of reduced metal on the channel walls.

My recently issued U.S. Pat. No. 5,034,354 discloses a family of alkali-free, lead silicate glasses that are adapted to perforated plate production. This glass family is composed essentially, in percent by weight, of 28–40% $SiO_2$, 42–55% $PbO$, 6–14% $BaO$, 2–8% $ZnO$, 1–5% $CaO$, 0–2% $MgO$, 0–5% $Al_2O_3$ and 0–1.5% $Sb_2O_3$.

With these glasses, as with the earlier alkali-containing glasses, it is necessary to fire the perforated plate in hydrogen. This reduces a layer of lead on the channel wall surfaces to obtain the required surface resistivity. This hydrogen reduction adds a further step, requiring special equipment, which it would be desirable to avoid. Also, there is a growing concern about working with lead-containing materials, especially where volatilization might occur.

Consideration has been given to the use of semiconducting glasses instead of reduced lead glasses. J. D. Mackenzie in "Modern Aspects of the Vitreous State", Vol. III (1964) defines a semi-conducting glass as "a homogeneous, single phased and noncrystalline solid in which (a) bulk electrical conduction at a given temperature occurs predominantly by electrons (and/or holes) rather than ions, and (b) the temperature coefficient of resistivity is negative." The literature abounds with examples of such glasses based on transition metal oxides, such as vanadium oxide, and on standard glasses containing special additives, such as bismuth oxide.

Previously known semiconducting glasses have not proven adaptable to the processing required in perforated plate production. Therefore, it is a basic purpose of the present invention to provide a family of semiconducting glasses that is adapted to such use. Another purpose is to provide a novel family of lanthana-iron borate glasses that are semiconducting. A further purpose is to provide such glasses that are resistant to devitrification.

SUMMARY OF THE INVENTION

The semiconducting glass family of my invention consists of lanthana borate glasses modified by iron oxide. As calculated on an oxide basis in weight percent, the glasses essentially of 40–55% $La_2O_3$, 10–30% $Fe_2O_3$ and 25–40% $B_2O_3$. The glasses resist devitrification and have a bulk resistivity of $10^8$–$10^{12}$ ohms-cm at 25° C. Preferred compositions consist of about 25% $Fe_2O_3$, 35–45% $La_2O_3$ and 40–30% $B_2O_3$.

The invention further contemplates a perforated plate composed of such glass. In one embodiment, the perforated plate is a component in a multichannel plate device.

PRIOR ART

In addition to art already mentioned, it may be noted that numerous patents and publications disclose the use of lanthana ($La_2O_3$) in optical glasses to enhance the refractive indices of the glasses. Also, various borate glass composition families are described as useful for optical purposes and for soft glass sealing applications. None of these disclosures are relevant to the present glasses.

U.S. Pat. No. 4,112,170 (Rauscher) discloses barium borosilicate glasses suitable for use as soluble core glasses, and is cited for that showing.

U.S. Pat. No. 3,782,958 (Bishay et al.) discloses glasses that are essentially alkali, or alkaline earth, metal borates containing iron oxide. The glasses are described as adapted to fabricating memory switching devices. This is a quite different purpose from multichannel plates. Further, the patent does not disclose $La_2O_3$ in its glass compositions.

GENERAL DESCRIPTION OF THE INVENTION

The present invention is based on discovery of a family of $La_2O_3$-$B_2O_3$-$Fe_2O_3$ glass melts that can be formed as tubing and that are relatively resistant to devitrifying. Glass formation in this ternary glass family occurs along the tie line corresponding to the $La_2O_3$.3-$B_2O_3$ ratio.

Figure 1:
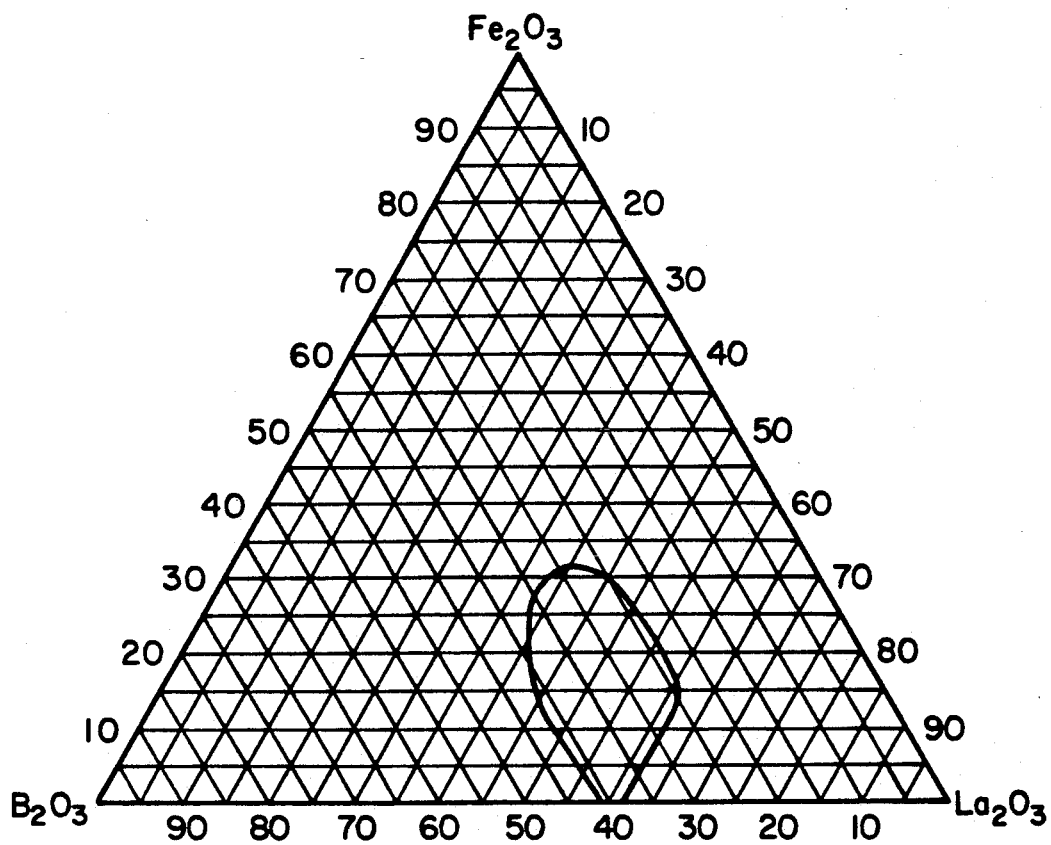
FIG. 1 is a ternary diagram representing the glass composition family of the invention.

FIG. 1 is a ternary diagram showing the glass forming region of the $La_2O_3$-$B_2O_3$-$Fe_2O_3$ ternary. The glass forming region is defined by a bulbous-shaped area that is enclosed by a solid line and that extends upwardly from the $B_2O_3$-$La_2O_3$ base line. The left hand end of the base line represents 100% $B_2O_3$, while the right hand end represents 100% $La_2O_3$. The apex represents 100% $Fe_2O_3$. In its broadest aspect then, the glass family consists essentially of, in weight percent on an oxide basis, 40–55% $La_2O_3$, 25–40% $B_2O_3$ and 10–30% $Fe_2O_3$.

The invention further resides in the discovery that the $La_2O_3$-$B_2O_3$-$Fe_2O_3$ glasses are semiconducting in nature. It has also been found that the resistivity of the glasses is a function of the amount of $Fe_2O_3$ in the glass. Accordingly, at least 10% $Fe_2O_3$ is required to provide the desired resistivity values. A content of about 25% is generally preferred for optimum resistivity while retaining good resistance to devitrification during working of the glass.

The invention is further illustrated by reference to a series of glass melts made in the course of defining the invention. The TABLE below shows the compositions of the glasses in weight percent on an oxide basis. The TABLE also shows measured and observed glass properties. These include the softening point (Soft.); the coefficient of thermal expansion over the range 25°–300° C. (CTE); the logarithm of the DC resistivity in ohms-cm (R); the appearance of the glass; and the degree of devitrification, if any.

Example 1–9 are glasses within the scope of the invention; examples 10–12 are comparative compositions outside the claimed ranges.

in larger commercial melts. Examples 10 and 11 illustrate the need for at least 10% $Fe_2O_3$ to provide a log R below 12. Example 12 shows the effect of excess lanthana.

Figure 2:
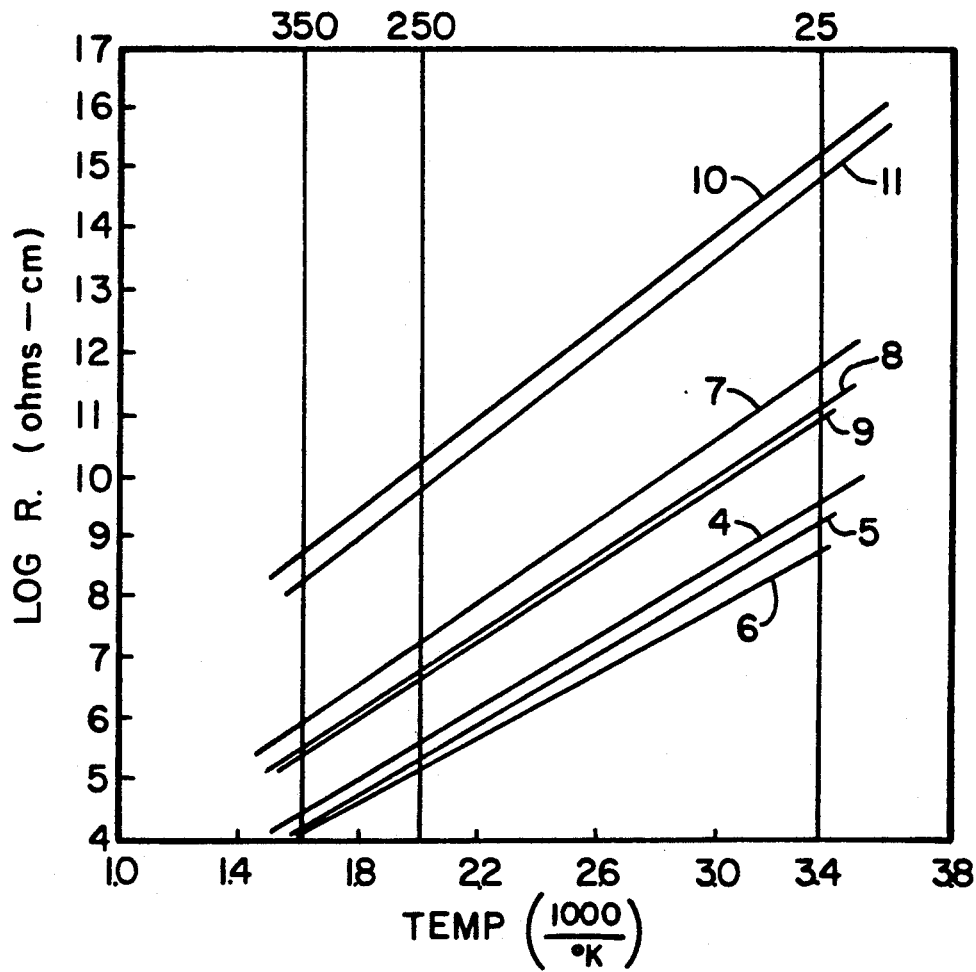
FIG. 2 is a graphical representation of temperature-resistivity curves for selected examples of the invention.

FIG. 2 is a graphical representation of temperature-resistivity curves for Examples 4–11 of the TABLE. In the FIGURE, temperature (Temp.) is plotted on the horizontal axis in terms of $$\frac{1000}{°K.}$$

as is customary for temperature-resistivity curves. Resistivity is plotted on the vertical axis in terms of log R in ohms-cm. It will be observed that the curves are straight lines over the plotted temperature range which is equivalent to 25°–350° C. Also, it will be noted that Examples 10 and 11 have significantly higher resistivity values which render them unsuitable as semiconducting glasses for present purposes.

I claim:

1. A semiconducting glass having a bulk resistivity in the range of $10^8$–$10^{12}$ ohms-cm and consisting essentially of, in weight percent on an oxide basis, 40–55%

TABLE

|  | 1 | 2 | 3 | 4 | 5 | 6 | 7 | 8 | 9 | 10 | 11 | 12 |
|---|---|---|---|---|---|---|---|---|---|---|---|---|
| $La_2O_3$ | 40 | 50 | 55 | 35 | 45 | 50 | 45 | 55 | 60 | 55 | 60 | 65 |
| $B_2O_3$ | 35 | 35 | 35 | 40 | 30 | 25 | 40 | 30 | 25 | 40 | 35 | 30 |
| $Fe_2O_3$ | 25 | 15 | 10 | 25 | 25 | 25 | 15 | 15 | 15 | 5 | 5 | 5 |
| Soft. | 675 | 699 | 711 | 683 | 689 | 696 | 706 | 710 | 719 | 732 | 731 | — |
| CTE | 64.0 | 66.7 | 67.0 | 63.3 | 67.6 | 73.3 | 62.5 | 71.6 | 74.4 | 64.3 | 69.1 | — |
| R | 9.80 | 10.95 | 12.10 | 9.64 | 9.30 | 8.81 | 11.8 | 11.2 | 11.03 | 15.29 | 14.87 | — |
| Appearance | Clear Black | Clear Black | Clear Black | Clear Black | Clear Black | Clear Black | Clear Black | Clear Black | Clear Black | Clear | Clear | Devitrified |
| Devit. | Surface | None | None | Surface | Slight | Slight | Surface | None | Surface | Some Unmelted | Surface | |

For each composition, a batch was prepared from oxides, or oxide precursors, such as carbonates. Each batch was placed in a silica crucible and heated at 1250° C. for 2 hours. The molten glass thus produced could be gathered and formed as tubing. The tubing could then be used with suitable core glass cane to produce clad cane. A variety of core glasses disclosed in the Rauscher patent (−170) are compatible with the present cladding glasses. The clad cane could be cut, bundled and redrawn to produce bundles. These can be cut into plates and etched to produce multichannel plates.

It will be observed that surface devitrification was noted on several examples. In some cases, this indicates a composition near the edge of the glass-forming region. In others, it indicates a condition that can be corrected $La_2O_3$, 25–40% $B_2O_3$ and 10–30% $Fe_2O_3$.

2. A semiconducting glass in accordance with claim 1 which consists essentially of, in weight percent on an oxide basis, 35–45% $La_2O_3$, 40–30% $B_2O_3$ and about 25% $Fe_2O_3$.

3. A perforated glass plate that is composed of a glass having a bulk resistivity in the range of $10^8$–$10^{12}$ ohms-cm and consisting essentially of, in weight percent on an oxide basis, 40–55% $La_2O_3$, 25–40% $B_2O_3$ and 10–30% $Fe_2O_3$.

4. A perforated glass plate in accordance with claim 3 which consists essentially of, in weight percent on an oxide basis, 35–45% $La_2O_3$, 40–30% $B_2O_3$ and about 25% $Fe_2O_3$.

* * * * *